US010813427B2

(12) United States Patent
Van Puyvelde

(10) Patent No.: US 10,813,427 B2
(45) Date of Patent: Oct. 27, 2020

(54) STRUTLESS UMBRELLA FRAME FOR SUPPORTING A CANOPY

(71) Applicants: ROYAL BOTANIA, Nijlen (BE); Kris Jan Simon Van Puyvelde, Boechout (BE)

(72) Inventor: Kris Jan Simon Van Puyvelde, Boechout (BE)

(73) Assignee: ROYAL BOTANIA, Nijlen (BE)

( * ) Notice: Subject to any disclaimer, the term of this patent is extended or adjusted under 35 U.S.C. 154(b) by 0 days.

(21) Appl. No.: 16/093,614

(22) PCT Filed: Apr. 12, 2016

(86) PCT No.: PCT/EP2016/058038
§ 371 (c)(1),
(2) Date: Oct. 12, 2018

(87) PCT Pub. No.: WO2017/178042
PCT Pub. Date: Oct. 19, 2017

(65) Prior Publication Data
US 2019/0116948 A1 Apr. 25, 2019

(51) Int. Cl.
A45B 25/16 (2006.01)
F16F 9/02 (2006.01)
(Continued)

(52) U.S. Cl.
CPC .......... A45B 25/165 (2013.01); F16F 9/0218 (2013.01); F16F 9/346 (2013.01); A45B 2019/007 (2013.01); F16F 9/02 (2013.01)

(58) Field of Classification Search
CPC ..................................................... F16F 9/346
See application file for complete search history.

(56) References Cited

U.S. PATENT DOCUMENTS 4,066,279 A * 1/1978 Kaptanis .................. E05F 3/02
188/288
4,433,759 A * 2/1984 Ichinose ................. E05C 17/30
16/51
(Continued)

FOREIGN PATENT DOCUMENTS

DE 1809697 A1 * 9/1970 ............. F16F 9/346
DE 10302870 B3 * 8/2004 ............ F16F 9/0245
(Continued)

OTHER PUBLICATIONS

International Search Report dated Dec. 15, 2016, in corresponding Application No. PCT/EP2016/058038, filed Apr. 12, 2016, 2 pages.
(Continued)

Primary Examiner — David R Dunn
Assistant Examiner — Danielle Jackson
(74) Attorney, Agent, or Firm — Christensen O'Connor Johnson Kindness PLLC

(57) ABSTRACT

A strutless umbrella frame for supporting a canopy, the strutless umbrella frame comprising a central post, a plurality of ribs each pivotally mounted to the central post about a pivot axis, an actuator arranged for operating the umbrella frame between the closed and open position; and a connection arranged for hingendly connecting each of the plurality of ribs to the actuator. The actuator comprises at least one air spring and first regulator and a second fluid regulator. The actuator is configured for opening the umbrella, in response to a predetermined opening force applied initially by the pivoting movement of at least one of ribs, and for closing the umbrella in response to a predetermined closing force applied initially by the pivoting movement of the at least one of the ribs.

21 Claims, 11 Drawing Sheets

(51) Int. Cl.
*A45B 19/00* (2006.01)
*F16F 9/346* (2006.01)

(56) References Cited

U.S. PATENT DOCUMENTS

| | | | |
|---|---|---|---|
| 4,747,422 A | 5/1988 | Chung | |
| 4,807,655 A * | 2/1989 | Robertson | A45B 23/00 135/20.3 |
| 5,711,332 A | 1/1998 | Apple | |
| 5,797,593 A * | 8/1998 | Oyaizu | F16F 9/3465 188/322.17 |
| 5,839,719 A * | 11/1998 | Hosan | B62D 25/12 267/64.12 |
| 5,961,102 A * | 10/1999 | Oyaizu | F16F 9/0209 188/300 |
| 6,092,632 A * | 7/2000 | Popjoy | F16F 9/0227 188/277 |
| 2005/0016803 A1 * | 1/2005 | Brummitt | F16F 9/0218 188/284 |
| 2005/0274583 A1 * | 12/2005 | Hewel | F16F 9/346 188/322.19 |
| 2010/0244340 A1 * | 9/2010 | Wootten | B60G 15/12 267/64.15 |

FOREIGN PATENT DOCUMENTS

| | | | | |
|---|---|---|---|---|
| EP | 0852302 A1 * | 7/1998 | | F16F 9/0209 |
| FR | 2088644 A5 * | 1/1972 | | F16F 9/346 |
| JP | S4711136 U * | 10/1972 | | |
| JP | 60234142 A * | 11/1985 | | F16F 9/346 |
| JP | 2015010650 A * | 1/2015 | | |
| JP | 2017048848 A * | 3/2017 | | F16F 9/32 |
| WO | WO-0135786 A1 * | 5/2001 | | A45B 25/16 |

OTHER PUBLICATIONS

International Preliminary Report on Patentability and Written Opinion dated Oct. 16, 2018, issued in corresponding International Application No. PCT/EP2016/058038, filed Apr. 12, 2016, 7 pages.

* cited by examiner

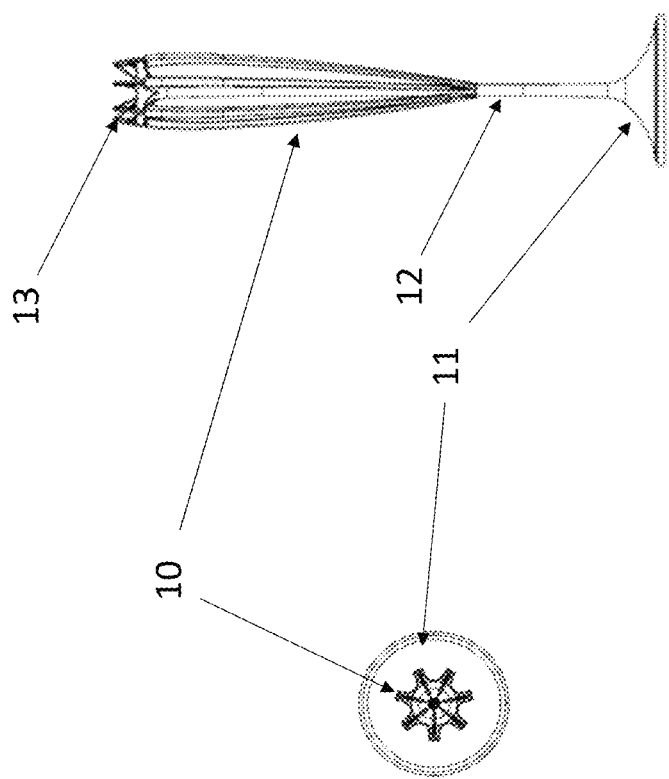

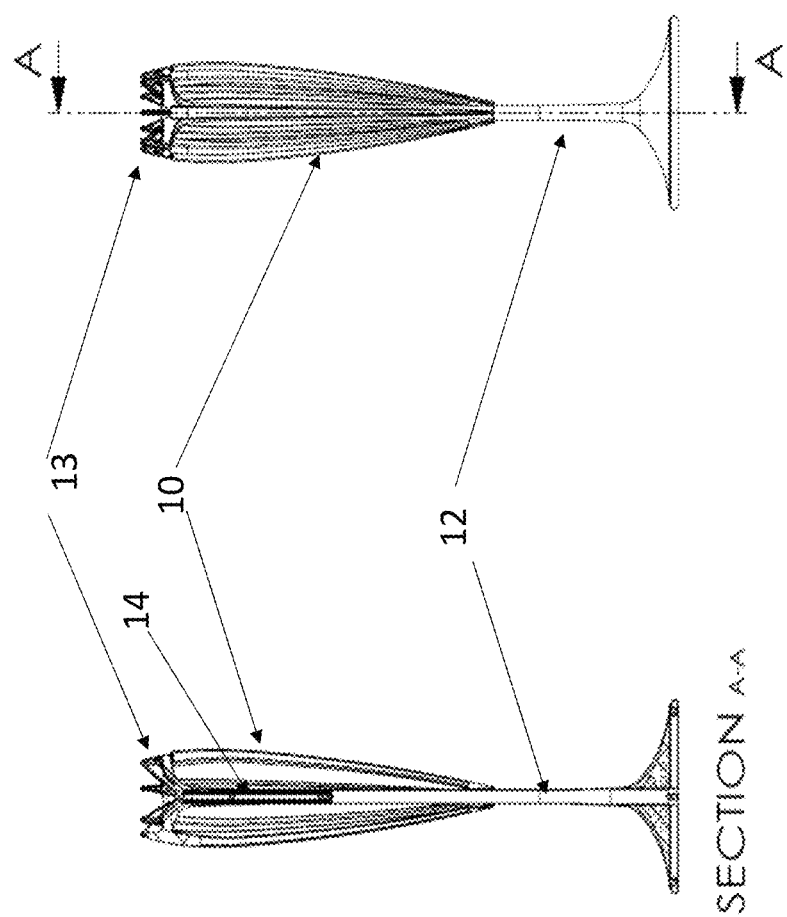

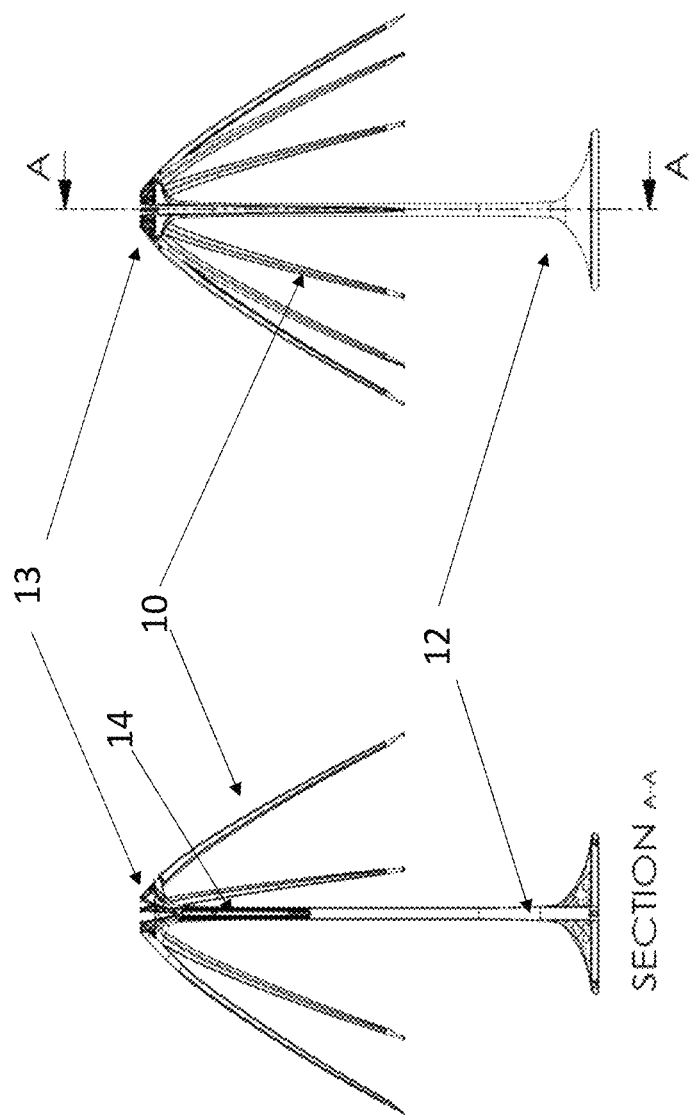

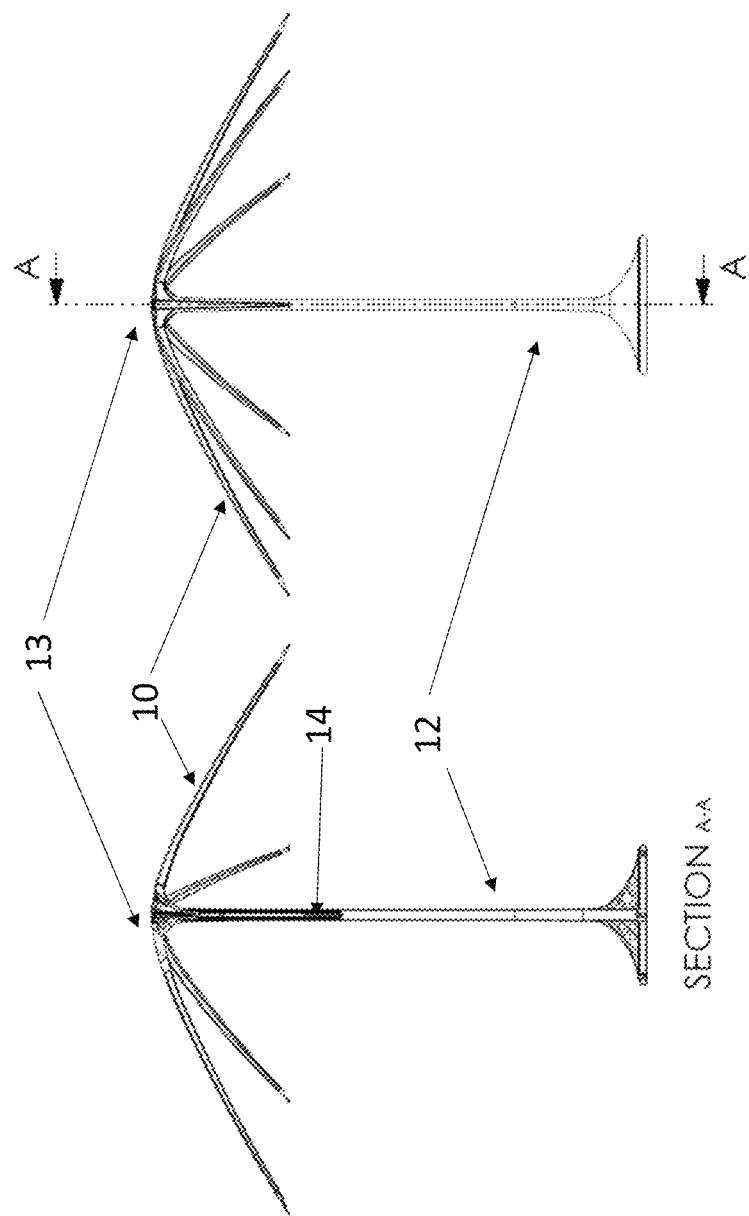

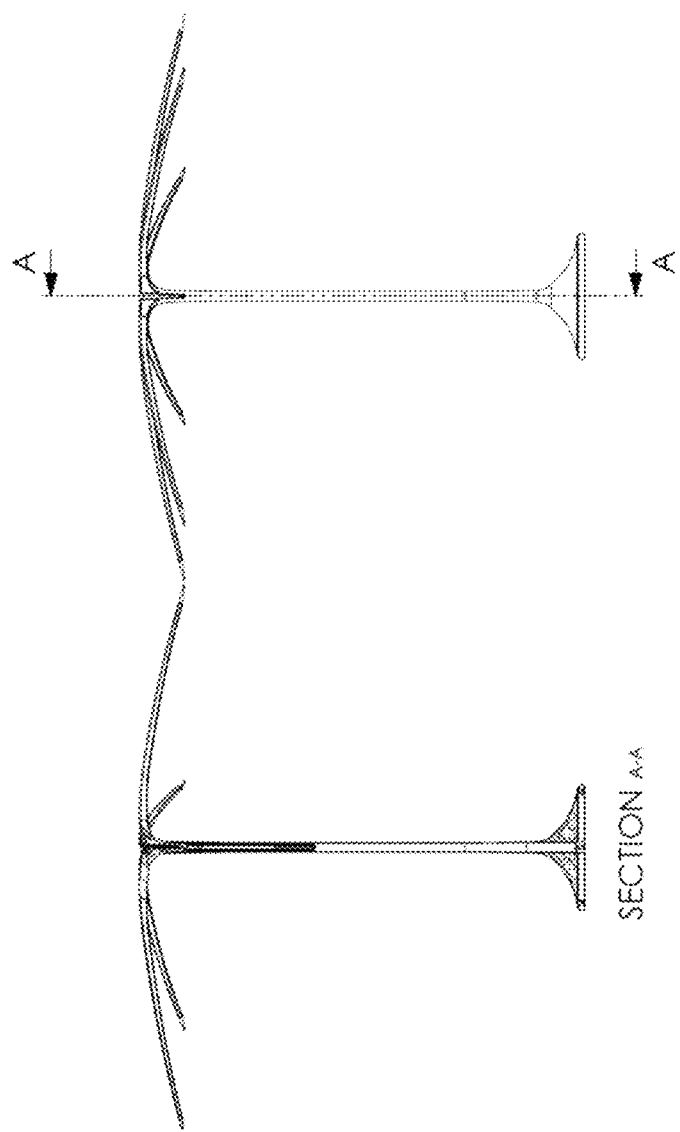

STRUTLESS UMBRELLA FRAME FOR SUPPORTING A CANOPY

TECHNICAL FIELD

Embodiments of the present disclosure relate in general to an umbrella frame arranged for supporting a canopy particularly suited for recreational use and more in particular to a strutless umbrella frame.

BACKGROUND

Traditional sunshade umbrellas are provided with a frame arranged for supporting a canopy, the frame of such umbrellas generally comprises a plurality of ribs each supported on a central post by at least one strut. In order to open and close the umbrella a pulley mechanism is usually provided, which pulley is arranged for slidably moving a sleeve along the external surface of the central post. The sleeve may be arranged for being connected to the ribs by the struts, such that a movement of the sleeve along the central post causes the ribs to move in between a retracted position, in which position the umbrella is closed, and an expanded position, in which position the umbrella is open. However, such an umbrella system has been proven to be difficult to operate, especially for large umbrellas arranged for supporting a large area canopy. This is because such umbrellas are usually heavier, thus requiring a relatively large amount of manual force to operate the pulley. Furthermore, the use of struts in addition to the cost of manufacturing involved, prevent the plurality of ribs, when the umbrella is closed, from folding neatly on the central post. As a result, when the umbrella is closed, a gap is formed between the central post and the plurality of ribs, which gap may cause, under windy conditions, for air to flow under the umbrella thereby generating an amount of force on the underside of the canopy at that can cause damage to the umbrella frame, due to the uneven pressure applied on the plurality of ribs and on the sleeve, or in the worst case cause the umbrella to unexpectedly open.

U.S. Pat. No. 5,711,332 discloses a strutless umbrella that includes a central post, either an inner plunger or tube, a canopy assembly including ribs pivotally mounted on the upper end of the central post. Links connect the ribs to the inner plunger or tube. Movement of one of the ribs moves the plunger or tube, which moves the remaining ribs. A latch pin holds the umbrella in the open position. In U.S. Pat. No. 5,711,332, the opening and closing of the umbrella is affected by moving the plunger within the central post in response to a pivoting movement of at least one of the ribs. However, the speed in which the plunger is moving with the central post will be greatly affected not only by the manual force applied to the at least one rib but also by the weight of the umbrella itself. As a result, for large area umbrellas, the weight acting on the plurality of ribs may cause the plunger to uncontrollably move in the open or closed position thereby risking damage to the umbrella and more importantly may pose a safety hazard for the person operating the umbrella.

SUMMARY

It is an aim of the present disclosure to provide a strutless umbrella frame arranged for supporting a canopy which overcomes the disadvantages of the prior art.

More specifically it is the aim of the disclosure to provide a strutless umbrella frame in which the action of opening and closing of the umbrella can be affected in a controlled manner irrespective of its dimensions or weight.

This aim is achieved according to the disclosure with the strutless umbrella frame showing the technical characteristics of the characterising part of the first claim.

More in particular, according to a first aspect of the present disclosure, a strutless umbrella frame is provided, which is arranged for supporting a canopy. The umbrella frame may be provided with a central post, which may be at least partially hollow, and a plurality of ribs pivotally mounted to the central post about a pivot axis. The plurality of ribs arranged for being retracted when the umbrella frame is in the closed position and for being extended when the umbrella frame is in the open position. The umbrella frame is further provided with an actuator mechanism disposed within the central post, which is arranged for operating the umbrella frame between the closed and open position. A connecting mechanism may be also provided for hingendly connecting each of the plurality of ribs to the actuator mechanism such that a force generated by the pivoting movement of the at least one of the ribs is transferred to the actuator mechanism. According to embodiments of the present disclosure, the actuator mechanism is provided with at least one air spring. The at least one air spring may be provided with a piston rod connected at one end to the connecting mechanism and to the other end on the outer surface of a piston. The piston is arranged for being reciprocably movable within a fluid tight cylinder barrel in response to an opening and a closing force applied by pivoting movement of at least one of the ribs. The piston being arranged for dividing the interior of the cylinder barrel into a first and a second fluid chambers. The cylinder barrel defines a first and a second pressure zone. The at least one spring may be provided with a first fluid regulating means arranged for allowing fluid, such as gas or liquid, to flow between the first and second fluid chambers when the piston is positioned along the first pressure zone. The air spring may further be provided with a second fluid regulating means arranged for allowing fluid to flow between the first and second fluid chambers, when the piston is positioned in the second pressure zone. The second fluid regulating means is arranged for being activated in response to the pressure in the first or second chamber reaching a predetermined threshold due to an external force applied on the piston by the pivoting movement of at least one of the ribs. The fluid tight cylinder may be filled at least partially with a fluid such as for example a liquid, preferably having a predetermined viscosity, or a gas or a combination of both, preferably a gas, such as nitrogen. The actuator mechanism is arranged for opening the umbrella, when the plurality of ribs are in the retracted position, in response to a predetermined opening force applied initially by the pivoting movement of at least one of ribs. The actuator mechanism is further arranged for closing the umbrella, when the plurality of ribs are in the extended position, in response to a predetermined closing force applied initially by the pivoting movement of the at least one of the ribs.

It has been found that by providing the actuator mechanism with a piston and a first and second fluid regulating means the opening and closing of the umbrella can be effected in a more controlled and safe manner, which is irrespective of the dimensions or the weight of the umbrella. Furthermore, depending on the orientation of the air spring, with the provision of a second fluid regulating means, the closing or opening of the umbrella frame may be for example be affected by exerting only an initial manual force. The initial manual force may activate the second fluid regulating means, so as to allow fluid to flow between the first and second fluid chamber, when the piston is positioned in the second pressure zone. Due to the activation of the second fluid regulating means, the forces holding the piston in the second pressure zone, may be overcome, thereby allowing the piston to move towards the first pressure zone at a predetermined speed. The speed, at which the piston is moved from the second pressure zone towards the first pressure zone, is determined by the rate in which the fluid flows through the second fluid regulating means when activated. Once the piston reaches the first pressure zone, the fluid may be unrestricted flow around the piston at a predetermined rate, thereby causing the piston to move towards the extended position. The speed at which the piston moves along the first pressure zone is determined by the rate at which the fluid flows around the piston through the first fluid regulating means. Depending on the orientation of the air spring, the piston as it moves in the extended position along the first pressure zone may cause the plurality of ribs to retract or extend without the need for applying a continuous external force on the at least one rib. This is because, in the first pressure zone, the piston is biased towards the extended position, due to forces acting on inside surface of the piston being applied over a greater surface area in comparison to the forces acting on the outside surface area of the piston to which the piston rod is connected. Therefore, when the piston is positioned in the first pressure zone the plurality of ribs are more biased towards a predetermined position, either retracted or extended depending on the configuration of the air spring. Therefore, when the piston is positioned along the first pressure zone, the actuator mechanism is arranged for automatically opening or closing the umbrella, i.e. preferably without the need for manually exerting a force on the piston by pivotally moving at one of the ribs. In this way, with the umbrella frame of the present disclosure, the manual force required to open or close the umbrella is at least significantly reduced compared to the state of the art solutions.

According to embodiments of the present disclosure, depending on the configuration of the air spring, the actuator mechanism is arranged for automatically opening or closing the umbrella frame, depending on the configuration of the air spring, in response to the positioning of at least one of the ribs at a predetermined angle with respect to the central post. For example, the predetermined angle may be between 10.0 and 50 degrees, preferably between 20 and 40 degrees, and more preferably between 25 and 30 degrees. For example, the second fluid regulating means may be arranged for being activated in response to the positioning of at least one of the ribs at a predetermined angle with respect to the central post. For example, in the case, where the piston is positioned in the second pressure zone, either when the umbrella is closed or opened, by positioning the at least one rib at a predetermined angle, would cause an opening or closing force to be exerted on the piston. The force applied by the at least one rib, would cause the pressure in the first or second chamber in the cylinder barrel to increase to a predetermined threshold, thereby causing the second fluid regulating means to be activated, resulting in the piston to move towards the first pressure zone. Depending on the length of the second pressure zone, the at least one rib may need to be maintained in the predetermined angle for a period of time until the piston reaches the first pressure zone. In the event, that the at least one rib being brought in the initial position while the piston is still in the second pressure zone, would cause the second fluid regulating means to be deactivated, thereby causing the piston to stop moving. It has been found that by configuring the actuator mechanism such that the automatic opening of the umbrella is affected at a predetermined angle, has the advantage that accidental opening or closing of the umbrella may be prevented.

According to embodiments of the present disclosure, the actuator mechanism is arranged for exerting a biasing force for biasing the plurality of ribs in the direction of the open or closed position depending on the orientation of the air spring. By biasing the plurality of ribs towards a predetermined position, either the open or close position, it is ensured that umbrella can be moved in the biased direction with the minimum of manual effort irrespective of the dimensions or weight of the umbrella. For example, when the umbrella is biased towards the open or closed position, the opening or closing of the umbrella requires only a minimum initial pivoting movement of the ribs for activating the second fluid regulating means so as to move the piston from the second pressure zone to the first pressure zone, which greatly simplify the opening or closing operation.

According to embodiments of the present disclosure, the first fluid regulating means may comprise a fluid bypass, which allows fluid, such as gas, to flow around the piston. For example the fluid bypass may be in the form of a groove extending longitudinally along the length of the first pressure zone defined in the cylinder barrel. The dimensions, preferably the depth, of the groove may be arranged to increase linearly along the length of the first pressure zone, and preferably towards the extended position of the piston. For example, the dimensions of the groove may increase linearly towards the cylinder barrel head located at one end of the cylinder barrel, which cylinder barrel head is arranged for sealing one end of the cylinder and delimiting the extension of the piston. By providing a fluid bypass, which has dimensions that linearly increase along the first pressure zone, may allow for adjusting the speed at which the piston moves along the first pressure zone by varying the rate at which fluid flows around the piston as the piston moves along the first pressure zone. In this way, the speed at which the umbrella frame is moved towards the open or closed position may be controlled, so as to ensure that damage to the umbrella or risk of injury to the operator due to the unexpected opening or closing of the umbrella is prevented.

According to embodiments of the present disclosure, the second fluid regulating means may be provided with at least one pressure activate valve. For example, the pressure activated valve may be arranged being closed when the pressure in the first chamber is equal to the pressure in the second chamber, while it may be open so as to allow fluid to flow between the two chambers when the pressure in either the first or second chamber exceed a predetermined threshold. For example, the second fluid regulating means may be provided with a first pressure activated valve, which may be arranged for being activated in response to the pressure in the first chamber reaching a predetermined threshold, and a second pressure activated valve arranged for being activated when the pressure in the second chamber reaches a predetermined threshold. The at least one pressure activated valve may be a one-way valve and, preferably comprises a spring.

According to embodiments of the present disclosure, the connecting mechanism comprises a pivoting connection arranged for mounting the plurality of ribs to the top of the central post. For example, the pivoting connections may be arranged for being retracted within the central post when the plurality of ribs are in the extended position. The connecting means may be provided with rigid connection means arranged for transferring the force applied by at least one of the ribs via the pivoting connections to the actuator mechanism, which may be disposed within the central post. For example, the rigid connecting means may be provided in the form of a sleeve slidably movable within the central post by the pivoting action of at least one of the ribs.

According to embodiments of the present disclosure, the actuator mechanism is positioned such that the cylinder barrel of the piston is towards the top of the central post. It has been found that by positioning the a cylinder barrel in this configuration, i.e. the upside down configuration, it is prevented that the piston comes in contact with the water when it rains, thereby significantly reducing the need for replacing the piston due to malfunctioning caused by the corrosion of the piston.

According to embodiments of the present disclosure, the actuator mechanism may be provided with a plurality of air springs, each connected to the plurality of ribs via the connecting mechanism. It has been found that by providing a plurality of air springs, for example two air springs, the amount of manual effort and time required for opening and closing the umbrella greatly is reduced, while significantly improving the controlling of the operation.

According to embodiments of the present disclosure, at least the central post is made from durable material, such as metal.

According to embodiments of the present disclosure, the plurality of ribs are arranged for supporting a canopy, which may be arranged for providing protection against the sun and/or rain.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 2a and 2b show respectively a top and a side view of the umbrella frame in the closed position according to embodiments of the present disclosure;

FIGS. 8a-8b, 9a-9b, 10a-10b, and 11a-11b show examples of the umbrella frame being operated in accordance with embodiments of the present disclosure from the closed to the open position.

DETAILED DESCRIPTION

Figures 1A, 1B:
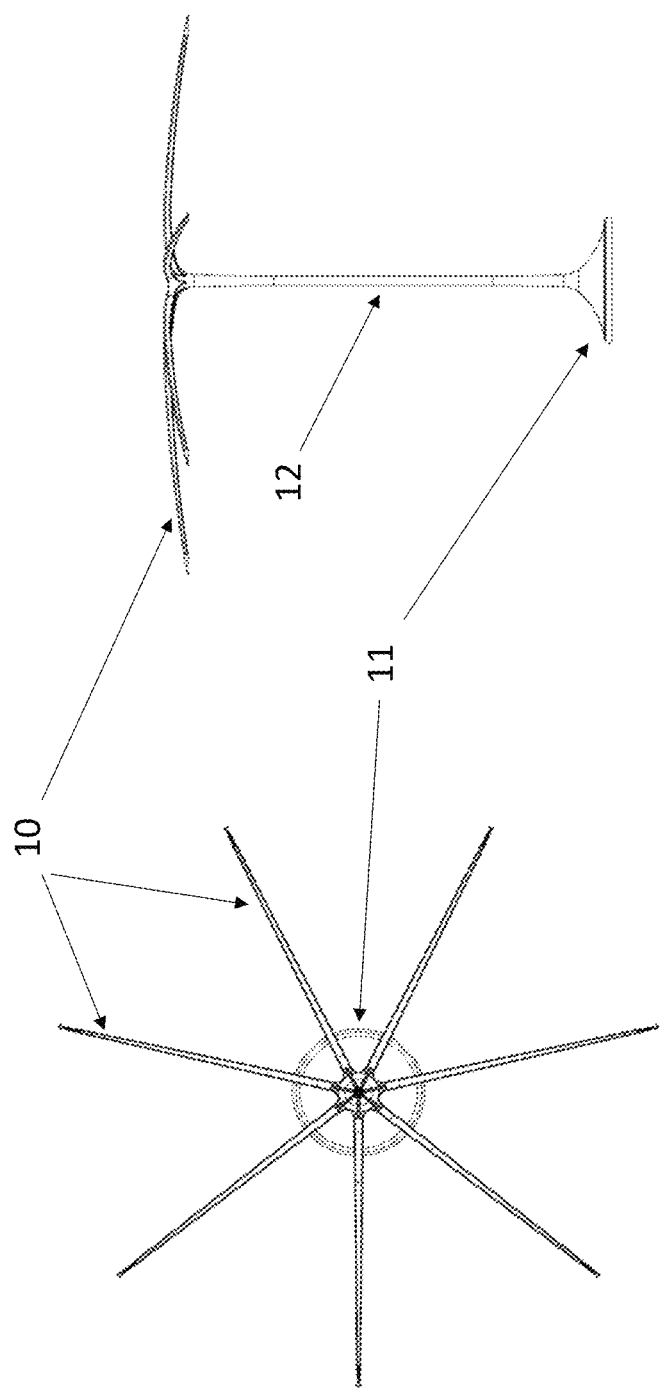
FIGS. 1a and 1b show respectively a top and side view of the umbrella frame in the open position according to embodiments of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

The present disclosure will be further elucidated by the examples shown in FIGS. 1 to 11b.

FIGS. 1a-1b and 2a-2b show an example of a strutless umbrella frame positioned respectively in the open and closed positions. As shown in FIGS. 1a-1b, the strutless umbrella frame is provided with a plurality of ribs 10 to which a canopy may be attached connected to a central post 12. The central post may be made of a durable material, such as metal. The plurality of ribs 10 are pivotably connected to the central post 12 by connecting mechanism 13. The connecting mechanism 13 may be provided with pivoting connections 18 allowing the each of the plurality of ribs to pivot about a pivoting axis.

The central post 12 may be provided as a single section, which is at least partially hollow, that is secured at one end to a base 11. Furthermore, the central post 12 may be provided with a plurality of sections, at least one of which may be hollow, that are interconnected to each other so as to form a single elongated structure suitable for supporting the plurality of ribs 10 and the canopy secured thereon.

Within the central post 12, an actuating mechanism 14 may be positioned, which is arranged for operating the umbrella frame between the open and closed position by respectively extending and retracting the plurality of ribs 10. The actuating mechanism 14 is connected by the connecting mechanism 13 to the plurality of ribs 10 such that a pivoting movement of the at least one the ribs 10 causes the actuator mechanism 14 to actuate within the central post, thereby causing the remaining ribs to move in the direction of the pivoting movement the at least one rib 10.

Figures 3A, 3B:
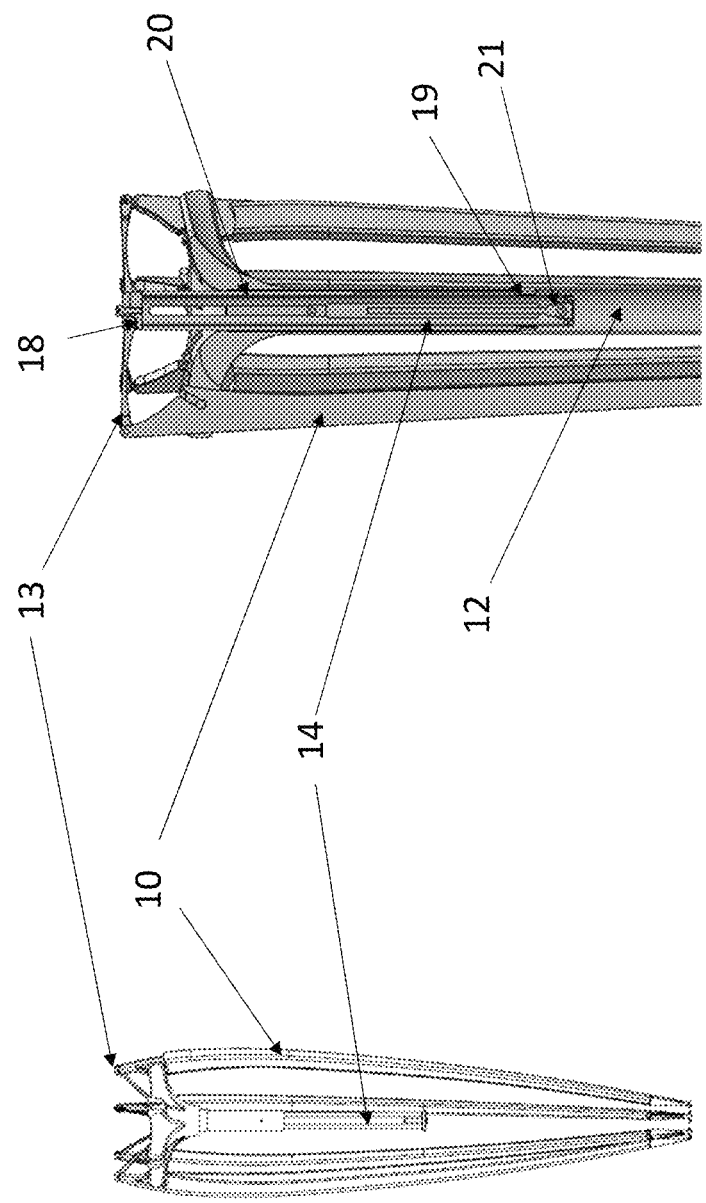
FIGS. 3a and 3b show respectively a side view and a cross-sectional view of a part of the umbrella frame according to embodiments of the present disclosure.
Figure 4:
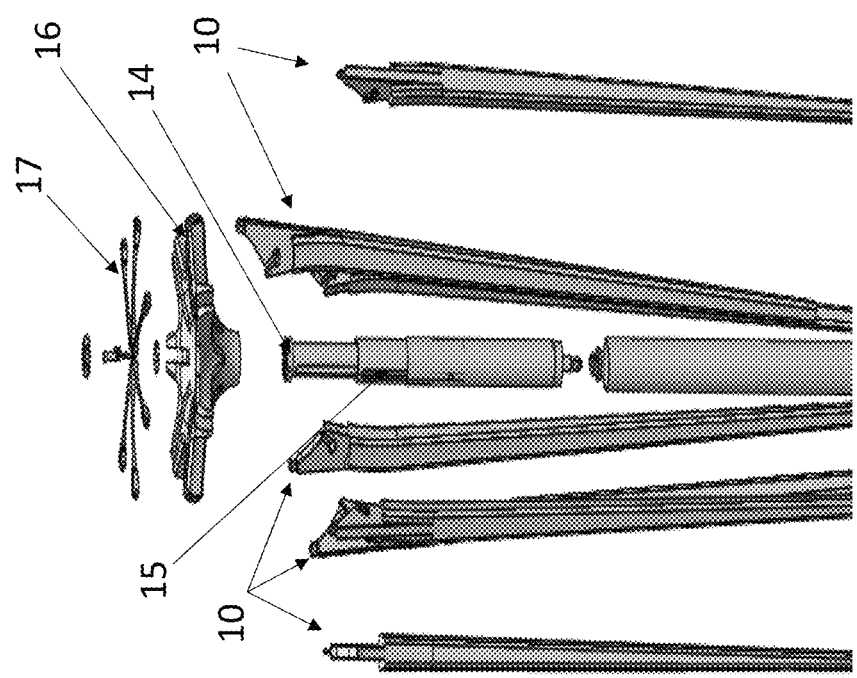
FIG. 4 show shows an example of the different components from which the umbrella frame is made according to embodiments of the present disclosure.

As show in FIGS. 3a-3b and 4, the actuator mechanism may be provided with at least one air spring, which may for example be positioned upside down within the central post 12, such that a biasing force exerted by the air spring is biasing the plurality of ribs in the extended position. However, it should be understood that the air spring may also be positioned such that the biasing force exerted by the air spring biases the plurality of ribs 10 in the retracted position or another position.

According to embodiments of the present disclosure, the actuator mechanism may be provided with a plurality of air springs, each connected to the connecting mechanism and arranged for minimising the force required for closing or opening the umbrella. It has been found that by positioning the air spring in the so-called upside down position prevents the air spring from coming in contact with water, when rain is directed within the central post 12, thereby significantly reducing the risk of corrosion of the air spring components.

The air spring may be provided with a piston rod 21 arranged for being connected to the plurality of ribs 10 via the connecting mechanism 13, such that a force applied by at least one of the ribs 10 is transferred to the piston rod for reciprocating a piston 22 with a fluid tight cylinder barrel 20 in a desired direction. The connecting mechanism 13 may be provided with a top member 16 which is connected at one end to the plurality of ribs 10 via the pivoting connections 18 and connected at the other end to the piston rod 21 via rigid connection means, which connection means may be in the form of a sleeve slidably movable within the central post 12, rods, or any other type of suitable connection means known to the skilled person in the art. The top member 16 is secured to the top of the central post 12 by fixing member 17, which may comprise a plurality of screws arranged for cooperating with corresponding bores in the central post 12. The connecting mechanism 13 may be arranged when the umbrella is positioned at either the closed or open position, depending on the configuration of the air spring, for being substantially retracted within the central post 12.

Figure 5:
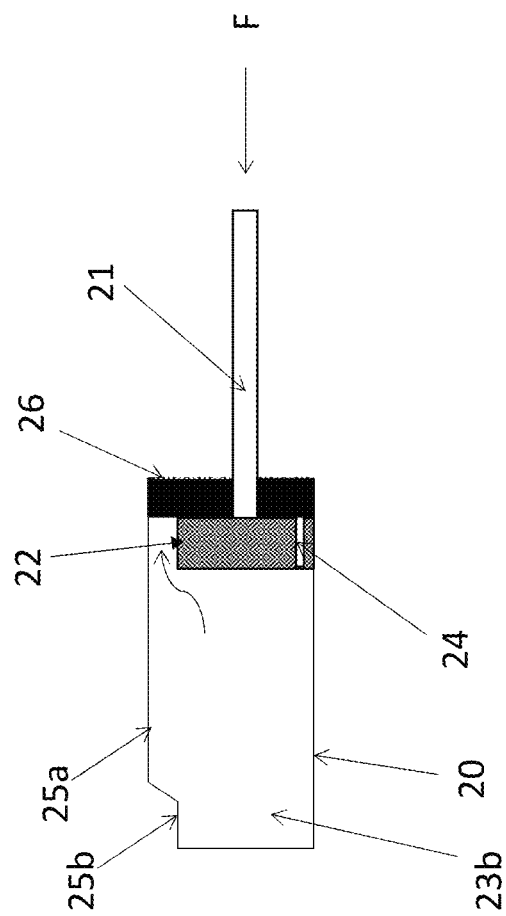
FIGS. 5 to 7 show an example of an air spring operation according to embodiments of the present disclosure.
Figure 6:
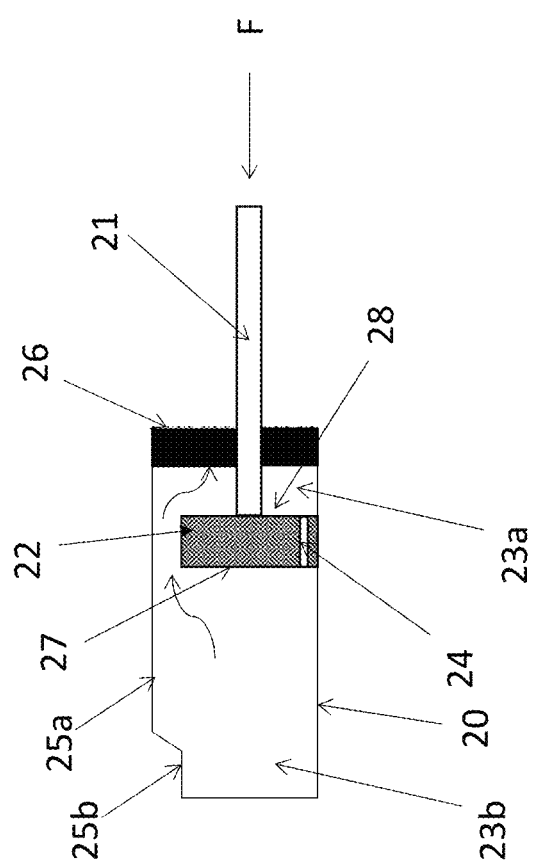
Figure 7:
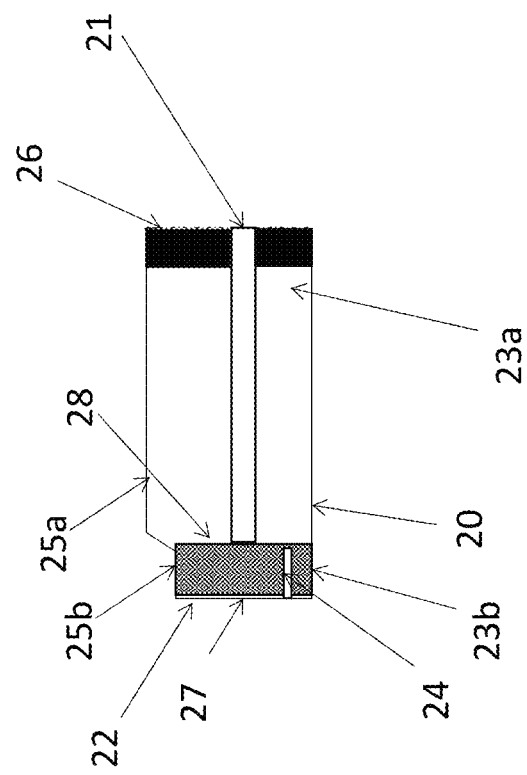

As shown in FIGS. 5 to 7, the actuating mechanism may be provided with at least one air spring comprising a piston rod 21 connected at one end to the connecting mechanism 13 via the pivoting connection 18 and to the other end on the outer surface of a piston 22. The piston 22 may be arranged for dividing the interior of a fluid tight cylinder barrel 20 into a first fluid chamber 23a and a second fluid chamber 23b. The piston 22 being reciprocably movable within the cylinder barrel 20 in response to an opening and a closing force applied by pivoting movement of at least one of the ribs 10.

The cylinder 20 may be arranged for defining a first pressure zone 25a, wherein in the first pressure zone 25a fluid within the cylinder barrel 20 may be allowed to flow around the piston 22, and a second pressure zone 25b, wherein in the second pressure zone 25b the piston 22 may be sealingly connected to the internal surface of the cylinder barrel 20, which may prevent fluid to flow between the first and second chambers 23a and 23b. At the second pressure zone 25b, due the fluids being prevented from flowing between the first and second chambers 23a and 23b, an external force acting on the piston rod 21, due to the pivoting movement of at least one of the ribs 10, may cause the pressure in the first chamber 23a to become higher or lower than the pressure in the second chamber 23b depending on the direction of the force acting on the piston 22.

The piston 22, depending on the orientation of the air spring, may be arranged for being positioned in the second pressure zone 25b, when the plurality of ribs 10 are in a more retracted position, and for being positioned in the first pressure zone 25a, when the plurality of ribs 10 are in a more open position. However, it should be noted that depending on the orientation of the air spring the piston 22 may be positioned in the first pressure zone 25a when the plurality of ribs are in a more retracted position, and for being positioned in the second pressure zone 25b, when the plurality of ribs 10 are in a more open or extended position.

The air spring may further be provided with a first fluid regulating means arranged for allowing fluid, such as gas or liquid, to unrestricted flow between the first and second fluid chambers 23a and 23b when the piston 22 may be positioned along the first pressure zone 25a. The first fluid regulating means may be in the form of a fluid bypass, such as a groove, which extends along the first pressure zone 25a.

For example the groove may be provided with linearly increasing dimensions so as to regulate the amount of fluid flowing between the first and second chambers 23a and 23b as the piston moves along the first pressure zone 25a. For example, the dimensions of the groove, preferably the depth or the width, may increase as the piston 22 is moved towards the cylinder head 26, which is arranged for sealing one end of the cylinder barrel 20 and delimiting the extension of the piston.

The air spring may be further provided with second fluid regulating means 24 arranged, when activated, for example by a sufficient elevated pressure in either the first or the second chamber 23a and 23b exceeding a predetermined threshold pressure, for allowing fluid to flow between the first and second fluid chambers 23a and 23b, when the piston 22 is positioned in the second pressure zone 25b, so as to allow the piston to move. The elevated pressure in the first or second chamber 23a and 23b may be caused due to an external force applied on the piston rod 21 when the piston 22 is positioned in the second pressure zone 25b. The second fluid regulating means 24 may be in the form of at least one pressure activating valve that may be arranged for being activated when the pressure in the first or second chamber 23a and 23b exceeds a predetermined threshold, thereby allowing fluid to flow around the piston 22 when the piston 22 is positioned in the second pressure zone.

The air spring may be provided with at least a first pressure activated valve, which may be activated by the pressure in the second chamber 23b reaching a predetermined threshold due to the compression of the fluid in the second chamber by the external force exerted on the piston rod 21, and a second pressure activated valve, which may be activated when the pressure in the first chamber 23a reaches a predetermined threshold due to an external force applied on the piston rod 21. The at least one pressure activated valve may be a one-way valve, and may preferably comprise a spring.

For example, when bringing the ribs from the retracted to the extended position, for example when opening the umbrella, the valve is activated by applying an opening force on the piston rod 21 by positioning at least one of the ribs at a predetermined angle with respect to the central post 12. This way a pressure will build up in the first chamber 23a and after exceeding a predetermined threshold pressure, the valve will be activated and opened allowing fluid to flow into the second chamber 23b. For example, the valve may comprise a spring that is arranged for activating the valve when at least one of the ribs 10 in positioned at a predetermined angle with respect to the central post 12. For example, by positioning at least one of the ribs at an angle between 10.0 and 50 degrees, preferably between 20 and 40 degrees, and more preferably between 25 and 30 degrees, allows the fluid to flow from first chamber 23a to the second chamber 23b, thereby allowing for the piston to be moved from the second pressure zone 25b to the first pressure zone 25a.

The operation of the air spring is exemplified in FIGS. 5 to 7. FIG. 5 shows an air spring in the extended position, at which position the piston 22 is close to the cylinder head 26 and the plurality of ribs may be positioned, depending on the orientation of the air spring, in the extended position. In response to a closing force F applied at the piston rod 21, the piston 22 is moved along the first pressure zone 25a towards the retracted position, thereby causing the fluid to flow around the piston via the first fluid regulating means, as shown by the arrows in FIG. 6.

When the piston 22 reaches the second pressure zone 25b, as shown in FIG. 7, fluid is prevented from freely flowing between the first and second chamber 23a and 23b, because the piston 22 at the second pressure zone is for example sealingly connected to the internal surface of the cylinder 20. When the piston reaches the second pressure zone 25b, the closing force applied to the piston 22 would cause the compression of the fluid in the second chamber 23b, thereby increasing the pressure of the chamber 23b.

Once the pressure in the second chamber 23b reaches a predetermined threshold, the second fluid regulating means 24 is activated, thereby allowing fluid to flow around the piston and allowing the piston to be moved fully to the retracted position. Once the pressure in the second chamber 23b becomes lower than the threshold, due to the closing force being removed, the second regulating means would be deactivated, thereby preventing fluid to flow around the piston 22. The piston 22 would then be maintained in the second pressure zone 25b and is no longer biased outwardly.

In order to move the piston again in the first pressure zone 25a, an opening force may be exerted on the piston rod 21, which force causes the second regulating means 24 to be activated once a threshold pressure is surpassed in the first chamber 23a, thereby allowing fluid to flow from the first chamber 23a to the second chamber 23b. This allows the piston 22 to be moved towards the first pressure zone 25a, at which zone fluid flows around the piston 22 thereby causing the pressure in the two chambers to equalise and biasing the piston outwardly, preferably even without having to apply an additional force to the ribs.

Although the pressure in the two chambers at the first pressure zone 25a would be substantially equal, the force acting on the inside surface 27 of the piston 22 would be greater than the force acting on the outside surface 28 of the piston 22, due to the larger surface area of the inside surface of the piston because of the presence of the rod. As a result, the piston 22 would preferably be moved towards the extended position without the need for applying a manual force.

The air spring may be arranged for opening the umbrella, when the plurality of ribs 10 are in the retracted position, in response to a predetermined opening force applied initially by the pivoting movement of at least one of ribs 10. The air spring may be arranged for closing the umbrella, when the plurality of ribs 10 are in the extended position, in response to a predetermined closing force applied initially by the pivoting movement of the at least one of the ribs 10, so as to move the plurality of ribs 10 in the retracted position.

According to the embodiments of the present disclosure, the umbrella frame may be operated between the closed and open position in response to a pivoting movement of at least one ribs. FIGS. 8a-8b, 9a-9b, 10a-10b, and 11a-11b show an example of an umbrella frame being operated from a closed position to the open position. As shown in FIGS. 8a-8b, when the umbrella frame is in the closed position, the plurality of ribs 10 are retracted to a position close to the central tube 12. The plurality of ribs 10 may be maintained in the retracted position by the air spring. Depending on the air spring configuration, the plurality of ribs 10 may be maintained in the retracted position by positioning the piston 22 in the second pressure zone 25b.

The opening of the umbrella frame may be affected in response to a predetermined opening force being applied initially by the pivoting movement of at least one of ribs 10, so as to move the plurality of ribs in the extended position, by activating the second fluid regulating means 24 so as to move the piston 22 towards the first pressure zone 25a. As shown in FIG. 6, by manually positioning at least one of the plurality of ribs 10 at a predetermined angle with respect to the central post 12, causes the second fluid regulating means 24 of the air spring to be activated, thereby allowing the piston to be moved from the second pressure zone 25b to the first pressure zone 25a.

As previously described, due to the difference of the surface area between the inside surface 27 of the piston 22 and the outside surface 28 of the piston 22, the piston 22 would then be biased towards the extended position, thereby causing the plurality of ribs to move towards the extended position, without the need for continuously applying an opening force. As a result, at the point wherein the force acting on the inside surface 27 of the piston 22 becomes preferably greater than force acting on the outside surface 28, causes the piston 22 to continuously move from the retracted position to the extended position. As a result, by pivotally moving at least one of the ribs 10 at a predetermined angle, a predetermined opening force may be applied to the piston rod 21 thereby causing the piston 22 to move towards the extended position as the biasing force acting on the inside of the piston becomes larger than the force exerted on the outside of the piston.

At that point, the piston would automatically move, and without the need for manual intervention, to the extended position, thereby moving the remaining of the plurality of ribs in the extended position, as shown in FIGS. 5 and 11a-11b. The predetermined angle at which the automatic opening of the umbrella may be affected may be between 10.0 and 50 degrees, preferably between 20 and 40 degrees, and more preferably between 25 and 30 degrees or any other desirable position.

According to embodiments of the present disclosure, the closing of the umbrella frame may be affected by applying a predetermined closing force to the piston 22 by pivotally moving at least one of the ribs 10 towards the retracted position, wherein force should be greater than the biasing force of the piston. Due to the continuous closing force applied by at least one of the ribs, the piston 22 would be move from the first pressure zone 25a to the second pressure zone 25b. At this position, the piston 22 would cause the pressure in the first chamber to increase to the predetermine threshold level, thereby causing the second fluid regulating means 24 to be activated so as to allow fluid to move around the piston.

Once the pressure in the first chamber 23a becomes lower than the threshold level, for example due to the removal of the closing force, the second fluid regulating means 24 would be deactivated thereby locking the piston 22 in the second pressure zone 25b. The piston 22 would be maintained in the second pressure zone 25b until for example a predetermined opening force is applied by at least one of the ribs 10 so that for example the second fluid regulating means are activated, due to the pressure in the second chamber 23b reaching a predetermined threshold, allowing the piston to be moved again from the second pressure zone 25b to the first pressure zone 25a.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A strutless umbrella frame arranged for supporting a canopy, the strutless umbrella frame being operable between a closed and an open position, the umbrella frame comprising:
   a central post;
   a plurality of ribs each pivotally mounted to the central post about a pivot axis, the plurality of ribs arranged for being retracted when the umbrella frame is in the closed position and for being extended when the umbrella frame is in the open position;
   an actuator disposed within the central post arranged for operating the umbrella frame between the closed and open positions; and
   a connection arranged for connecting each of the plurality of ribs to the actuator such that a force generated by movement of at least one of the ribs is transferred to the actuator;
   the actuator comprising:
   at least one air spring comprising a piston rod connected at one end to the connection and at the other end to an outer surface of a piston, wherein the piston is reciprocably movable within a fluid tight cylinder barrel in response to an opening and a closing force applied by pivoting movement of the at least one of the ribs, the piston being arranged for dividing the interior of the cylinder barrel into a first and a second fluid chamber, wherein the cylinder barrel defines a first and a second pressure zone;
   a first fluid regulator arranged for allowing fluid to flow between the first and second fluid chambers when the piston is positioned along the first pressure zone; and
   a second fluid regulator arranged for allowing fluid to flow between the first and second fluid chambers when the piston is positioned in the second pressure zone, wherein the second fluid regulator is arranged for being activated in response to the pressure in the first or second chamber reaching a predetermined threshold due to the force applied on the piston by the pivoting movement of at least one of the ribs;
   wherein the actuator is arranged for:
   opening the umbrella, when the plurality of ribs are retracted, in response to the opening force applied by the pivoting movement of at least one of ribs, and
   closing the umbrella, when the plurality of ribs are extended, in response to the closing force applied by the pivoting movement of the at least one of the ribs.

2. The umbrella frame according to claim 1, wherein the piston is arranged for being positioned in the second pressure zone, when the plurality of ribs are retracted, and for being positioned in the first pressure zone, when the plurality of ribs are extended.

3. The umbrella frame according to claim 1, wherein the second fluid regulator is arranged for being activated in response to pivoting of at least one of the ribs at a predetermined angle with respect to the central post.

4. The umbrella frame according to claim 3, wherein the predetermined angle is between 10 and 50 degrees, preferably between 20 and 40 degrees.

5. The umbrella frame according to claim 1, wherein the actuator is arranged, when the piston is positioned in the first pressure zone, for exerting a biasing force for biasing the plurality of ribs in the direction of the open position.

6. The umbrella frame according to claim 1, wherein the first fluid regulator comprises a fluid bypass allowing fluid to flow between the first and second chambers.

7. The umbrella frame according to claim 6, wherein the fluid bypass is in the form of a groove extending along the length of the first pressure zone in the cylinder barrel.

8. The umbrella frame according to claim 7, wherein the dimensions of the groove increase linearly along the length of the first pressure zone.

9. The umbrella frame according to claim 1, wherein the connection comprises pivoting connections arranged for mounting the plurality of ribs to the top of the central post.

10. The umbrella frame according to claim 9, wherein the pivoting connections are arranged for being retracted within the central post when the plurality of ribs are in the extended position.

11. The umbrella frame according to claim 9, wherein the connection comprises a rigid connection means arranged for transferring the force applied by at least one of the ribs via the pivoting connections to the actuator.

12. The umbrella frame according to claim 11, wherein the rigid connection means are disposed within the central post.

13. The umbrella frame according to claim 12, wherein the rigid connecting means comprise a sleeve slidably movable within the central post by the pivoting movement of at least one of the ribs.

14. The umbrella frame according to claim 1, wherein the actuator is positioned such that the cylinder barrel of the piston is towards the top of the central post.

15. The umbrella frame according to claim 1, wherein the actuator comprises a plurality of air springs each connected to the plurality of ribs via the connection.

16. The umbrella frame according to claim 1, wherein the central post is made from metal.

17. The umbrella frame according to claim 1, wherein the plurality of ribs are arranged for supporting a canopy.

18. An umbrella comprising an umbrella frame according to claim 1, wherein the plurality of ribs are supporting a canopy.

19. A strutless umbrella frame arranged for supporting a canopy, the strutless umbrella frame being operable between a closed and an open position, the umbrella frame comprising:
   a central post;
   a plurality of ribs each pivotally mounted to the central post about a pivot axis, the plurality of ribs arranged for being retracted when the umbrella frame is in the closed position and for being extended when the umbrella frame is in the open position;
   an actuator disposed within the central post arranged for operating the umbrella frame between the closed and open positions; and a connection arranged for hingedly connecting each of the plurality of ribs to the actuator such that a force generated by the pivoting movement of at least one of the ribs is transferred to the actuator;

the actuator comprising:

at least one air spring comprising a piston rod connected at one end to the connection and at the other end to the outer surface of a piston, wherein the piston is reciprocably movable within a fluid tight cylinder barrel in response to an opening and a closing force applied by pivoting movement of the at least one of the ribs, the piston being arranged for dividing the interior of the cylinder barrel into a first and a second fluid chamber, wherein the cylinder barrel defines a first and a second pressure zone;

a first fluid regulator arranged for allowing fluid to flow between the first and second fluid chambers when the piston is positioned along the first pressure zone; and a second fluid regulator arranged for allowing fluid to flow between the first and second fluid chambers when the piston is positioned in the second pressure zone, wherein the second regulator is arranged for being activated in response to the pressure in the first or second chamber reaching a predetermined threshold due to the force applied on the piston by the pivoting movement of at least one of the ribs;

wherein the actuator is arranged for:

opening the umbrella, when the plurality of ribs are retracted, in response to the opening force applied by the pivoting movement of at least one of ribs, and closing the umbrella, when the plurality of ribs are extended, in response to the closing force applied by the pivoting movement of the at least one of the ribs, wherein the second fluid regulator comprises at least one pressure activated valve.

20. The umbrella frame according to claim 19, wherein the at least one pressure activated valve is a one-way valve.

21. A strutless umbrella frame arranged for supporting a canopy, the strutless umbrella frame being operable between a closed and an open position, the umbrella frame comprising:

a central post;

a plurality of ribs each pivotally mounted to the central post about a pivot axis, the plurality of ribs arranged for being retracted when the umbrella frame is in the closed position and for being extended when the umbrella frame is in the open position;

an actuator disposed within the central post arranged for operating the umbrella frame between the closed and open positions; and a connection arranged for hingedly connecting each of the plurality of ribs to the actuator such that a force generated by the pivoting movement of at least one of the ribs is transferred to the actuator;

the actuator comprising:

at least one air spring comprising a piston rod connected at one end to the connection and at the other end to the outer surface of a piston, wherein the piston is reciprocably movable within a fluid tight cylinder barrel in response to an opening and a closing force applied by pivoting movement of the at least one of the ribs, the piston being arranged for dividing the interior of the cylinder barrel into a first and a second fluid chamber, wherein the cylinder barrel defines a first and a second pressure zone;

a first fluid regulator arranged for allowing fluid to flow between the first and second fluid chambers when the piston is positioned along the first pressure zone; and a second fluid regulator arranged for allowing fluid to flow between the first and second fluid chambers when the piston is positioned in the second pressure zone, wherein the second regulator is arranged for being activated in response to the pressure in the first or second chamber reaching a predetermined threshold due to the force applied on the piston by the pivoting movement of at least one of the ribs;

wherein the actuator is arranged for:

opening the umbrella, when the plurality of ribs are retracted, in response to the opening force applied by the pivoting movement of at least one of ribs, and closing the umbrella, when the plurality of ribs are extended, in response to the closing force applied by the pivoting movement of the at least one of the ribs, wherein the second fluid regulator comprises a first pressure activated valve arranged for being activated in response to the pressure in the first chamber reaching a predetermined threshold and a second pressure activated valve arranged for being activated when the pressure in the second chamber reaches a predetermined threshold.

* * * * *